C. L. HALL.
COFFEE-ROASTER.

No. 174,521. Patented March 7, 1876.

WITNESSES:
F. C. Dietrich
H. C. McArthur

INVENTOR:
C. L. Hall
per:
T. H. Alexander
ATTORNEY.

UNITED STATES PATENT OFFICE.

CASSIUS L. HALL, OF YPSILANTI, MICHIGAN, ASSIGNOR OF ONE-HALF HIS RIGHT TO GEORGE W. PARSONS, OF SAME PLACE.

IMPROVEMENT IN COFFEE-ROASTERS.

Specification forming part of Letters Patent No. 174,521, dated March 7, 1876; application filed December 10, 1875.

*To all whom it may concern:*

Be it known that I, CASSIUS L. HALL, of Ypsilanti, in the county of Washtenaw and State of Michigan, have invented certain new and useful Improvements in Coffee-Roasters; and I do hereby declare that the following is a full, clear, and exact description thereof, reference being had to the accompanying drawings, and to the letters of reference marked thereon, which form part of this specification.

The nature of my invention consists in the construction and arrangement of a coffee-roaster, as will be hereinafter more fully set forth.

In order to enable others skilled in the art to which my invention appertains to make and use the same, I will now proceed to describe its construction and operation, referring to the annexed drawing, in which—

Figure 1:
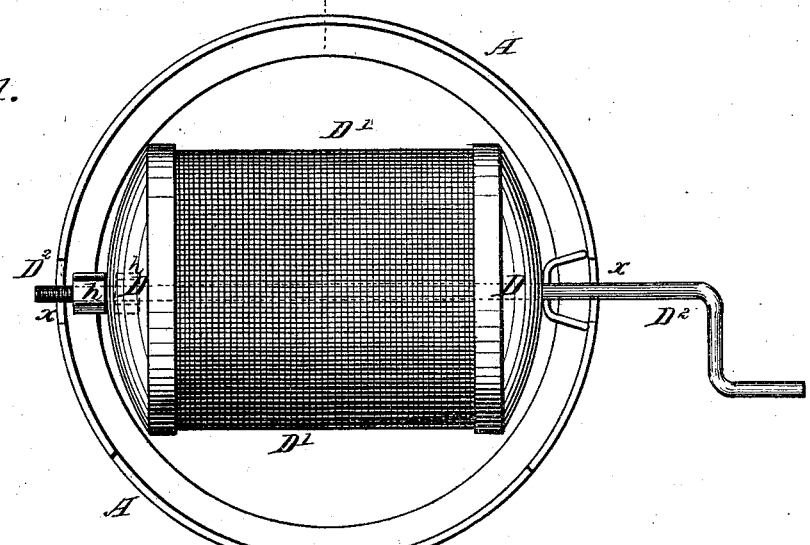
Figure 2:
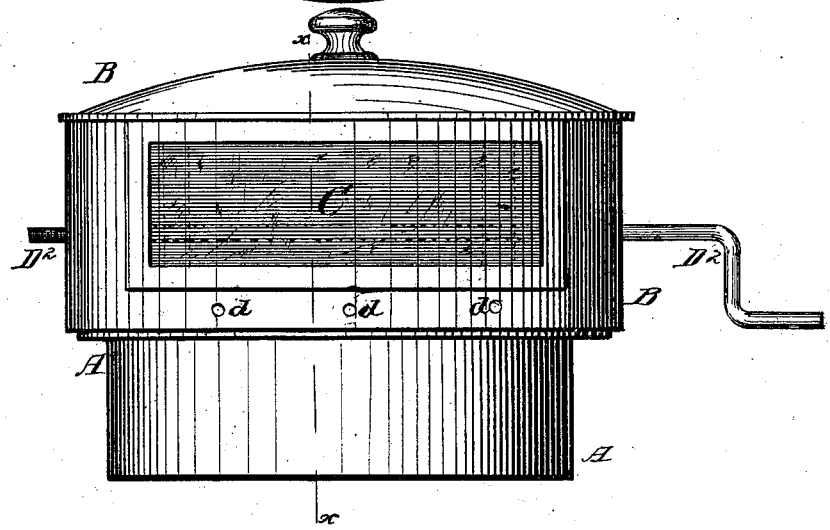
Figure 3:
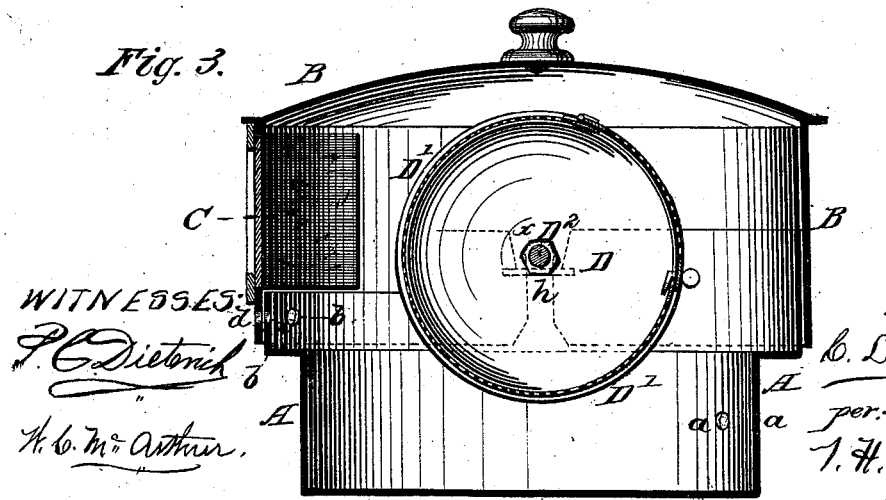

Figure 1 is a plan view with top removed. Fig. 2 is a side elevation, and Fig. 3 is a central vertical section on line $x'\ x'$, Fig. 1.

The outside case of my coffee-roaster is made in two parts, A and B. The part A is made in the form of an ordinary tea-kettle, without top, and of sheet-iron or other suitable material. It is shaped so that the lower portion thereof fits within the stove, and in the back of this portion are a series of draft-holes, $a\ a$. The part B constitutes a cap to fit over the upper portion of the kettle A, and has mica C inserted in its front to enable the operator to see when the coffee is done without opening the roaster, which would admit cold air. Below the mica C are draft-holes $b$, to correspond with similar draft-holes $d$ in the front of the kettle A. By means of these various draft-holes the smoke of the roasting coffee is caused to escape into the stove. The air goes in through the holes $d\ b$, the heat below causing a draft to draw the smoke out through the holes $a$, which are within the stove. This also keeps the mica front C free from smoke, so that the interior of the roaster can be easily seen. The top or cap B can be turned sufficiently to one side to close the vent-holes $b$, which is to be done when the coffee is first put in, as by so doing it will heat faster, and when it begins to smoke the draft is to be opened. The interior cylinder, in which the coffee is placed to be roasted, is made in the usual manner of two sheet-metal heads, D D, with a wire-cloth or wire-screen cylinder, $D^1$, between them and a central shaft, $D^2$, is passed through the heads. The shaft is fastened by means of two nuts, $h\ h$, one on each side of one of the heads, which allows this end of the shaft to be lengthened or shortened at will, to suit the cylinder. The ends of the shaft $D^2$ rest in wide notches $x$ made in the kettle A, which wide notches allow the shaft to play far enough to let the upper cap be turned to cover the air-holes.

Having thus fully described my invention, what I claim as new, and desire to secure by Letters Patent, is—

1. The kettle-shaped coffee-roaster case A, having draft-openings $a$ in that portion which drops into the stove-hole, and having draft-openings $b$ in the body of the case, above the stove-top, as set forth.

2. In combination with the kettle-shaped case A, having draft-openings $b$, the movable cap B, having draft-openings $d$, whereby the air may enter the interior of the case A, or be shut off at will, by rotating the cap, as set forth.

3. The combination of the kettle A with draft-holes $a\ b$ and wide notches $x\ x$, the cap B with mica front C and draft-holes $d$, and the interior cylinder D $D^1$ with central shaft $D^2$, all substantially as and for the purposes herein set forth.

In testimony that I claim the foregoing as my own, I affix my signature in presence of two witnesses.

CASSIUS L. HALL.

Witnesses:
E. P. ALLEN,
TUBAL C. OWEN.